ically reduced corresponding arcuate movement being transmitted to the element carrying the tool holder. Preferably the lever has a pair of opposite blind passages having partially overlapping cross-sectional contours with a wafer of resilient plastic material interposed in the bottoms of these passages, and with bearing studs connected to the two elements being received in the passages and engaging on opposite sides of the wafer.

United States Patent

[15] 3,686,964

Thibaut et al.

[45] Aug. 29, 1972

[54] TOOL HOLDERS WITH CONTROLLED TOOL MOVEMENT

[72] Inventors: Christian Thibaut; Andre Ballini, both of Billancourt, France

[73] Assignee: Regie Nationale des Usines Renault, Billancourt (Hauts de Seine), France

[22] Filed: April 13, 1970

[21] Appl. No.: 27,804

[30] Foreign Application Priority Data

April 21, 1969 France......................6912443

[52] U.S. Cl. ....................74/110, 408/186, 74/470
[51] Int. Cl................................................F16h 27/04
[58] Field of Search ........74/110, 470; 408/186, 187

[56] References Cited

UNITED STATES PATENTS

| | | | |
|---|---|---|---|
| 1,231,347 | 6/1917 | Heiser | 408/187 |
| 1,336,311 | 4/1920 | Martin | 408/186 |
| 2,878,696 | 3/1959 | Busch | 408/186 |
| 2,390,647 | 12/1945 | Heckman | 408/187 |
| 3,477,340 | 11/1969 | Faugli et al. | 408/187 |
| 3,402,613 | 9/1968 | Neusel et al. | 74/89.15 |
| 246,662 | 9/1861 | Cox | 74/110 |

*Primary Examiner*—William F. O'Dea
*Assistant Examiner*—Wesley S. Ratliff, Jr.
*Attorney*—Stevens, Davis, Miller & Mosher

[57] ABSTRACT

A control system for a tool holder which is attached to one of a pair of elements which are hinged together at one end and are normally urged toward each other at the other end. A control member such as a push rod extends through a hole in the other of the elements and actuates a lever in a chamber between the two elements. The end of the lever away from the control member is held between two relatively closely spaced fulcrum points on the two elements so that a given movement of the control member results in a substantially reduced corresponding arcuate movement being transmitted to the element carrying the tool holder. Preferably the lever has a pair of opposite blind passages having partially overlapping cross-sectional contours with a wafer of resilient plastic material interposed in the bottoms of these passages, and with bearing studs connected to the two elements being received in the passages and engaging on opposite sides of the wafer.

7 Claims, 5 Drawing Figures

Patented Aug. 29, 1972
3,686,964
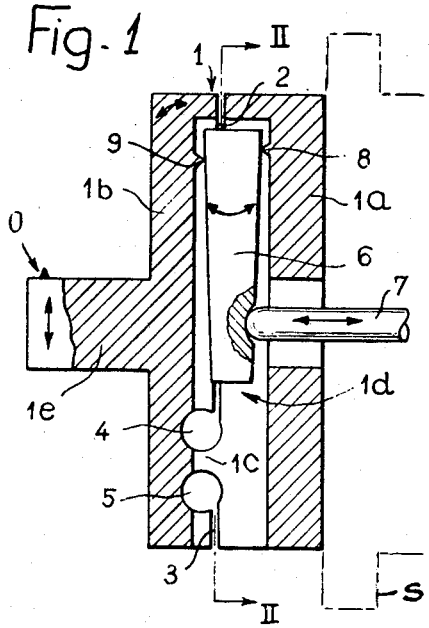
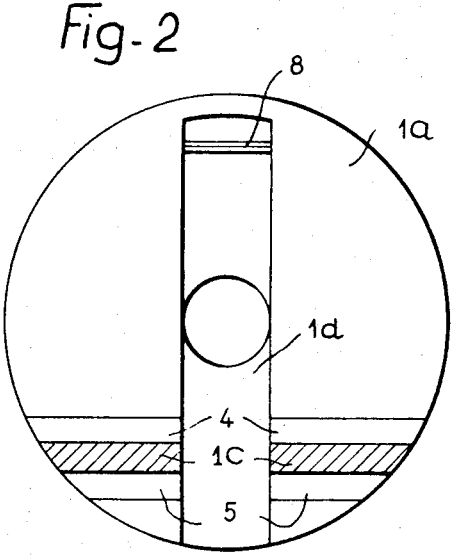
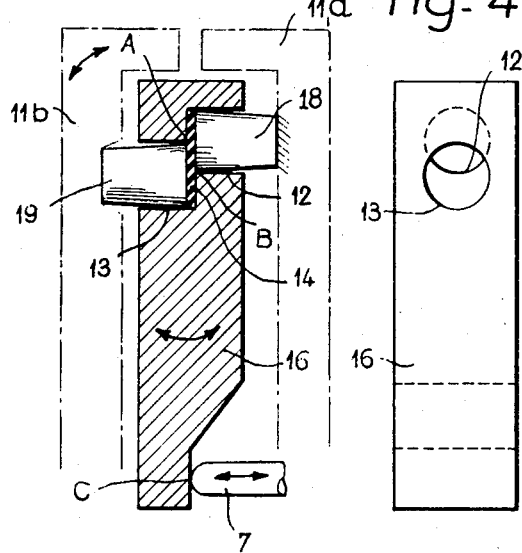
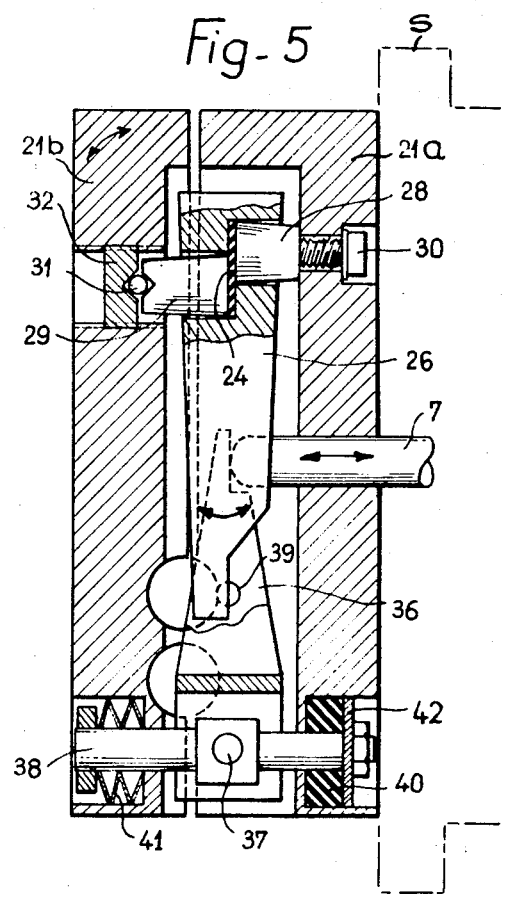

TOOL HOLDERS WITH CONTROLLED TOOL MOVEMENT

This invention relates in general to tool holders and more particularly to tool holders having a controlled tool movement characteristic.

It is known that in the finishing machining of mass-produced parts on automatic-cycle machine tools it is highly desirable to have the possibility of introducing a tool wear correction in order to take full advantage of the automatic machining feature. It is also necessary to use a tool holder characterized by a great stiffness but responsive to the tool feed means which must be capable of transmitting micrometric movements with fidelity and accuracy under considerable loads.

It is the object of the present invention to provide a tool holder capable of meeting these various yet contradictory requirements.

The tool holder according to this invention is characterized essentially in that it comprises two elements adapted to be moved angularly away from each other against a resilient force, one element being displaceable away from the other element constituting the tool holder, this arrangement further comprising a push member extending through one of said elements and adapted to control this movement, a lever interposed between said push member and a pair of relatively closely spaced fulcrum points of said elements, in order to introduce a reduction ratio leverage into the push member to tool holder element control system.

According to a preferred form of embodiment of this invention, the tool holder is further characterized in that said lever has formed therein a pair of opposed blind passages having partially overlapping cross-sectional contours, adapted to receive bearing studs between which a wafer of resilient plastic material is interposed, whereby said studs bear against the bottoms of said passages through the medium of said plastic wafer. As a result, the movements of said lever are attended by a simple distortion of said plastic wafer without any frictional contact, which imparts a high degree of sensitiveness to the relative movements of said studs, without any starting slip inertia (the so-called "stick-slip" effect).

Other features of this invention will also appear as the following description proceeds with reference to the accompanying drawing illustrating diagrammatically by way of example typicals forms of embodiment of the tool holder of this invention.

In the drawing:

FIG. 1 is an axial section showing a first form of embodiment;

FIG. 2 is a section taken along the line II—II of FIG. 1 with the lever and push member omitted;

FIG. 3 is another sectional view showing a preferred mounting of the reduction lever arrangement;

FIG. 4 is a side elevational view of the lever of FIG. 3, and

FIG. 5 is a sectional view showing another form of embodiment of the tool holder incorporating a lever of the type illustrated in FIGS. 3 and 4.

The tool holder illustrated in FIG. 1 comprises a tool holder body proper of cylindrical configuration and shown generally by the reference numeral 1, which comprises two main elements 1a, 1b hingedly interconnected at 1c by forming in said body a pair of slots 2 and 3 extending transversely to the cylinder axis and opening into a pair of adjacent holes 4, 5 extending at right angles to a radius of this cylinder, the aforesaid resilient hinge-forming portion 1c being thus left between these holes. Moreover, this body is hollowed at 1d for receiving a lever 6 controlling the movements of elements 1a and 1b away from each other. This lever 6 is responsive to a control push member 7 extending in the axial direction through element 1a ; besides, said lever 6 is disposed between a pair of fulcrum points consisting in this example of a pair of opposite knife-edges 8 and 9 formed on elements 1a and 1b respectively at relatively close distances in relation to the axis of push member 7. The elements 1a and 1b are constantly urged against the lever 6 through the medium of springs (not shown) disposed substantially at the level of said fulcrum points, in this case the knife-edges 8 and 9. One of the elements, in this example element 1a, is adapted to be secured to a support S; therefore the other element 1b of the body 1 carries the tool 0 which, in this example, is secured to an axial extension 1e of this element 1b. The aforesaid tool holder support may consist notably of a driving spindle having the control push member 7 disposed coaxially therewith, in this case.

It is clear that with this particular arrangement of lever 6 a movement of element 1b in relation to the tool-holding element 1a can be obtained at the level of fulcrum or knife-edge 8, said movement being considerably scaled or stepped-down in relation to the movement of control push member 7, the ratio of the two movements corresponding to that existing between the difference in the relative distance between knife-edges 8 and 9 in a direction perpendicular to the axis of the thrust, on the one hand, and the distance from knife edge 9 to this axis, on the other hand. Under these conditions it is possible to produce micrometric displacements of the tool-holding element 1a under considerable loads, and therefore movements of the tool 0 that are centered to the hinge 1c, by means of movements of greater amplitude of the control push member 7, while disposing of a tool holder characterized by a very great stiffness.

FIGS. 3 and 4 illustrate a particular arrangement of the reduction lever, this arrangement giving a higher degree of fidelity and precision in the resultant tool movements than the preceding example.

In the arrangement illustrated in FIGS. 3 and 4 the body comprises likewise a pair of elements 11a, 11b movable away from each other and having disposed therebetween a lever 16 responsive to the axial movements of push member 7. At the levels of the bearing engagement of the lever 16 with the body this lever 16 has formed from opposite sides inwards a pair of offset blind passages 12, 13 extending to half the lever thickness ; the cross-sectional contour of these passages 12, 13 somewhat overlap each other, and the passages are engaged by a bearing stud 18 rigid with the corresponding element 11a and by another bearing stud 19 abutting against the other element 11b movable away from element 11a. Between the adjacent ends of these studs 18, 19 is a relatively thin strip or wafer 14 of resilient plastic material ; preferably, this arrangement is such that the plane of wafer 14 in the inoperative lever position illustrated in the figures contains the point of contact between this lever and the push member 7, and that said wafer 14 is normally fully engaged by the corresponding and registering surfaces of said studs and lever. At their adjacent ends the studs 18 and 19 have substantially the same contour as of the bottom of their relevant blind passages 12, 13, but this contour tapers down towards the corresponding elements 11a and 11b to permit the angular movements of the lever 16 in relation thereto.

This form of embodiment is advantageous in that it avoids any relative slip between the studs and lever, thus ensuring a true and accurate control action in the absence of any starting inertia due to the surface to surface frictional contact also referred to as the "stick-slip" effect, and at the best when the plane of wafer 14 is disposed in the above-defined preferred fashion the three points of the lever arm producing the desired scaling between the control and output movements may be considered as lying at A, B and C, i.e. very substantially in a common plane. It will also be noted that the bearing recesses 12, 13 may be disposed very close to each other in order to produce a very considerable reduction effect by means of a single lever.

FIG. 5 illustrates another form of embodiment of the same character but incorporating a second scaling lever.

This arrangement also comprises a pair of tool holder body elements 21a, 21b movable away from each other and having disposed therebetween a lever 26 adapted to co-act as in the case of FIGS. 3 and 4 with a pair of bearing studs 28, 29 having disposed therebetween a wafer 24 of resilient plastic material; bearing stud 28 is secured by means of a screw 30 to element 21a and the thrust stud 29 engages through the medium of a ball 31 an adjustable stop member 32 secured in element 21b, said ball 31 being retained in corresponding registering conical recesses formed in the members 29 and 32, as shown.

At its end remote from these bearing means the lever 26 is responsive not directly to the push member 7 but to another lever 36 having a forked end pivotally supported by a pair of trunnions 37 carried by a rod 38 secured between elements 21a and 21b in opposition to said bearing studs, said second lever 36 being engaged at its other end by the control push member 7 and provided intermediate its ends with a transverse pin 39 engaging said remote end of lever 26. The leverage reduction produced in the tool holder movement is dependent on the step-down ratio introduced by the second lever 36 which corresponds to the ratio of the distance from trunnions 37 to studs 39 to the distance from trunnions 37 to push member 7, and also on the step-down ratio introduced by said lever 26 as already explained hereinabove with reference to FIGS. 3 and 4.

To produce at the tool level a compensation of the variations occuring in the tool holder condition, the rod 38 is connected at one end to the element 21a (constituting the bearing element during the movement of the tool holding element 21b away therefrom) through the medium of a plastic ring 40 and at its other end slidably mounted in element 21b this rod is secured through the medium of a spring for compressing the ring 40, this spring consisting in this case of dished spring washers 41 compressed by a rod-mounting nut.

The axial movements of stud 29 which are caused by the expansion of the resilient wafer 24 are compensated by the expansion of the plastic ring 40 of which the increment in thickness causes the trunnions 37 carried by the bearing element to recede thus ensuring an invariable position of said stud. It may also be noted that the ring 40 is inserted in the tool holder body for following or accomodating the temperature variations in the tool holder assembly, and also to permit its elastic distortion this ring is enclosed completely and in a fluid-tight manner between its cavity in the body element 21a and a washer 42.

While typical embodiments of the present invention have been disclosed and illustrated herein, it is to be understood that these embodiments are given by way of example only and not in a limiting sense.

We claim:

1. A tool holder control apparatus comprising a pair of elements forming a chamber therebetween, means connecting said elements to allow angular movement of the elements relative to each other against a resilient force normally urging the elements towards each other, a tool holder connected to one of said elements, a lever disposed in said chamber and adjacent one end being disposed between a pair of relatively closely spaced fulcrum points at adjacent inner surfaces of said elements, the other of said elements being provided with an aperture adjacent the other end of said lever, means for supporting the tool holder connected to said other element, and control means extending through said aperture into operative engagement with said lever so that a linear movement of said control means results in a corresponding scaled down angular movement between said elements.

2. Apparatus according to claim 1, wherein said means connecting said elements comprises a resilient hinge, said elements and said resilient hinge comprising an integral body.

3. Apparatus according to claim 1, wherein said lever is provided with a pair of opposed blind passages having partially overlapping cross-sectional contours, a wafer of resilient plastic material disposed within said passages, and a pair of bearing studs extending into said passages to bear against said wafer, the other ends of said studs constituting said fulcrum points.

4. Apparatus according to claim 3, wherein one of said studs engages the element connected to the tool holder through a bearing ball.

5. Apparatus according to claim 3, including an additional lever pivotally mounted between said elements and directly contacted by said control means, said additional lever having a member to engage said lever adjacent one end thereof.

6. Apparatus according to claim 5, wherein said additional lever is pivoted to transverse trunnions carried by a means parallel to said control rod, said rod being mounted between said elements by means including a resilient plastic ring fitting into a recess provided in one of said elements and by spring means to compress said ring in order to compensate for any expansion of said wafer by expansion of said ring.

7. Apparatus according to claim 1, wherein said control means directly contacts said lever.

* * * * *